UNITED STATES PATENT OFFICE.

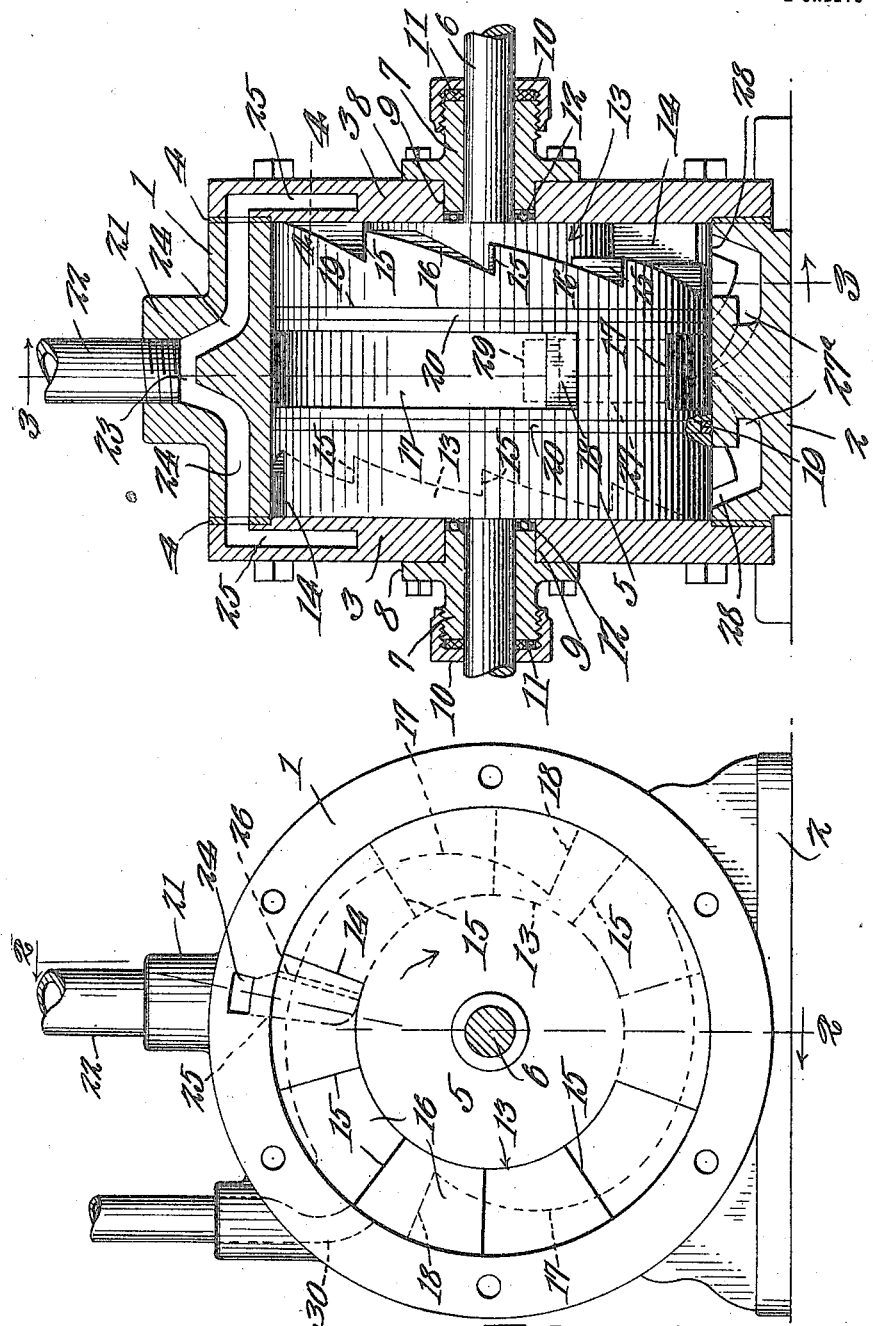

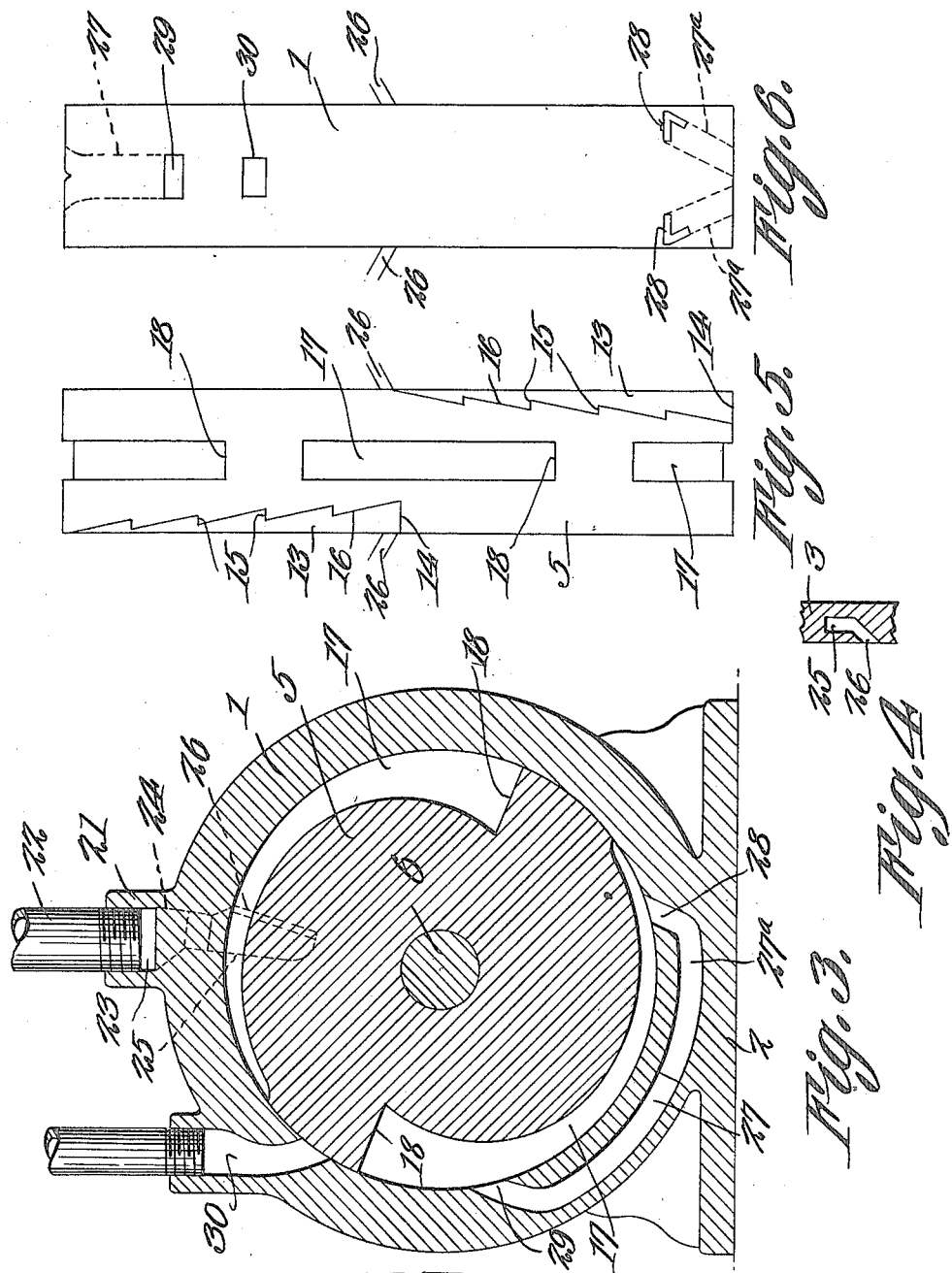

JOHN L. FLESHMAN, OF OSTRANDER, WASHINGTON.

ROTARY ENGINE.

1,180,122. Specification of Letters Patent. Patented Apr. 18, 1916.

Application filed August 25, 1915. Serial No. 47,297.

*To all whom it may concern:*

Be it known that I, JOHN L. FLESHMAN, a citizen of the United States, residing at Ostrander, in the county of Cowlitz and State of Washington, have invented a new and useful Rotary Engine, of which the following is a specification.

The present invention appertains to rotary engines, and aims to provide a novel and improved machine of that character.

It is the object of the invention to provide a rotary engine embodying a rotor rotatable within a stator or casing, the stator having ports for supplying steam or pressure fluid to the rotor, the rotor having means whereby the steam in impinging thereagainst will actuate the rotor, the stator also having means whereby the steam which impinges against the rotor from the stator is carried from the rotor and applied to another portion thereof to assist in the actuation of the rotor and to provide a compound engine of the rotary type.

The engine embodies a novel assemblage and coöperation of the component parts, whereby the engine will be thoroughly efficient, practical and powerful in operation. It is also within the scope of the invention to provide a rotary engine having the foregoing characteristics, and which at the same time, is characterized by a simple, inexpensive and durable construction, the engine being valveless and operating smoothly.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Figure 1 is a side elevation of the engine with the near side plate removed to expose the rotor. Fig. 2 is a vertical section of the engine taken on the line 2—2 of Fig. 1. Fig. 3 is a vertical section of the engine taken on the line 3—3 of Fig. 2. Fig. 4 is a sectional detail taken on the line 4—4 of Fig. 2. Fig. 5 is a diagrammatical view of the periphery of the rotor, and Fig. 6 is a diagrammatical view of the interior of the stator or casing.

In carrying out the invention, there is provided an annular stator or casing 1 having a suitable base 2, and being preferably in the form of a casting. This stator or casing is provided with circular side plates 3 bolted or otherwise fastened to the edges of the stator 1, suitable gaskets 4 being preferably disposed between the stator 1 and side plates 3 to provide a tight joint.

Mounted for rotation snugly within the stator 1, is a cylindrical rotor 5 mounted concentrically upon a shaft 6 projecting through the central portions of the side plates 3 concentrically of the stator. The shaft 6 is journaled through bearings 7 which are provided with outstanding flanges 8 between their ends bolted or otherwise secured to the outer sides of the plates 3 and having their inner ends received by openings 9 provided in said plates. Gland nuts 10 are threaded upon the outer ends of the bearings 7 around the shaft 6, and compress the packings 11 against the shaft 6 to prevent leakage. Anti-frictional balls 12 are preferably disposed between suitable ball races provided in the inner ends of the bearings 7 and side faces of the rotor 5, whereby the rotor can rotate freely and with little friction.

The periphery of the rotor works snugly adjacent the interior of the stator 1, and the side faces of the rotor rest snugly adjacent the side plates 3 of the stator. The two side faces of the rotor 5 are provided with diametrically opposite arcuate chambers or cavities 13 each extending through an arc of about 180°. Each chamber or pocket 13 is relatively deep at one end to provide a shoulder 14, and is shallow at the other end so as to merge or vanish into the respective side face of the rotor. The chambers 13 are arranged adjacent and extend to the periphery of the rotor so that the chambers are open both at the side faces of the rotor and the periphery thereof. It is to be noted that the chambers are diametrically opposite, whereby the deep end or shoulder 14 of each chamber is disposed longitudinally opposite the shallow end of the opposite chamber. The helical walls of the chambers 13 which face the side plates 3 are of zig-zag formation to provide shoulders 15 facing in the same direction with respect to the periphery of the rotor, as the shoulders 14, there being helical or oblique faces 16 between the shoulders 15. Each series of shoulders 15 is arranged at an acute angle relative to the respective side plate 3, the shoulders 15 being arranged closer to the side plate 3 the farther the shoulders 15 are located from the respective shoulder 14.

The periphery of the rotor is provided with diametrically opposite chambers 17 between or intermediate the side faces of the rotor, and the chambers or cavities 17 are of semi-crescent-shape, as will be evident by referring to Fig. 3. In other words, each chamber 17 is deep at one end and is shallow at the other end so as to merge or disappear into the periphery of the rotor, the deep ends of the chambers 17 providing shoulders 18 facing in the same direction with respect to the periphery of the rotor as the shoulders 14 and 15 of the chambers 13. The chambers 17 are located in the same plane, and the chambers 17 are therefore defined by arcs of slightly less than 180°, to separate the ends of the chambers 17.

To prevent the passage of the steam or pressure fluid between the chambers 13 and 17, the periphery of the rotor 5 is provided with annular grooves 19 between the chambers 17 and 13, and packing rings 20 are fitted within the grooves 19 and contact with or bear against the interior of the stator 1 to prevent the escape of steam from one chamber along the periphery of the rotor to another chamber.

In order to supply steam to the rotor, the periphery of the stator 1 is provided with an outstanding boss 21 into which the discharge end of the steam supply pipe 22 is threaded, and the boss 21 is provided with a recess 23 for receiving the steam from the pipe 22. The stator 1 has passages 24 extending in opposite directions from the recess 23 to the edges of the stator 1 and to the plates 3, the passages 24 being in alinement and being arranged at one point of the stator. The plates 3 are provided with opposite radial passages 25 whose outer ends communicate with the remote ends of the passages 24, and the plates 3 have oblique ports 26 leading from the passages 25 to the interior of the stator and toward the side faces of the rotor. The inlet ports 26 are arranged at an acute angle relative to the side faces of the rotor and project in the same general direction relative to the periphery of the rotor, as suggested in Fig. 5. The ports 26 are so disposed as to project toward the shoulders 14 and 15, whereby the steam in entering the chambers 13 from the ports 26 will impinge against the shoulders 14 and 15. The ports 26 are opposite one another, and when one port 26 is in communication with the respective chamber 13, the other port 26 is closed by the respective side face of the rotor.

In order to carry the steam from the chambers 13 to the chambers 17, the stator 1 is provided with a passage 27 extending longitudinally therein, and having one end forked to provide branches 27ª extending toward the opposite sides of the stator. The ends of the branches 27ª are turned inwardly to provide ports 28 in the inner cylindrical surface of the stator 1, and disposed opposite to the ports 26 to provide outlet ports for the chambers 13. The ports 26 and 28 are so arranged, that when one of the chambers 13 starts to leave the respective port 26, the opposite end of the said chamber 13 reaches the respective port 28 to allow the steam to pass from said chamber 13 into the passage 27. The other end of the passage 27 is turned inwardly to provide a port 29 in the inner cylindrical surface of the stator 1, and disposed between the ports 26 and 28 to communicate with the chambers 17 when the chambers 13 are brought into communication with the ports 29. The port 28 provides an inlet port for the chambers 17, and the stator 1 is provided with an outlet port 30 for the chambers 17 between the ports 29 and 26, whereby when the chambers 17 pass and leave the ports 29, they will communicate with the outlet port 30 to allow the steam to pass off to the atmosphere. During the time that one of the chambers 13 is passing or moving adjacent the respective inlet port 26, the respective port 28 is closed by the periphery of the rotor, while the other chamber 13 is in communication with the other port 28.

The operation of the engine is as follows:—Supposing that one of the chambers 13 is in communication with the respective inlet port 26, the other or opposite chamber 13 will be in communication with the respective port 28, the other ports 26 and 28 being closed by the rotor. The steam will therefore flow through the respective passages 24—25 and out through the open port 26 into the chamber 13 which is in communication therewith, and the steam will first impinge against the shoulder 14, imparting a rotatory movement to the rotor. As the rotor turns, the steam will impinge against the shoulders 15 in succession, thereby exerting a continuous pressure upon the rotor. Now, when the rotor has turned through one-half of a revolution, the chamber 13 which has just received the steam will leave the respective port 26, and will be brought into communication with the respective port 28, and the other chamber 13 will be brought into communication with the respective port 26 to receive steam therefrom. The opposite chambers 13 are thus alternately brought into communication with a pair of ports 26, to provide a continual discharge of steam against the rotor, whereby a practically continuous pressure of the steam is obtained for actuating the rotor. When one of the steam-filled chambers 13 communicates with the respective port 28, the steam will flow by expansion through the passage 27 so as to discharge from the port 29 into the respective chamber 17 which at that moment communicates with the port 29 while the respective chamber 13 is in communication with the respective port 28. The steam flowing by expansion into the respective chamber 17 will impinge against the shoulder 18 thereof, thereby assisting in the actuation of the rotor, and providing a compound engine utilizing the expansion of the steam for materially assisting in the production of power. When the chambers 17 pass and leave the ports 29 they are brought into communication with the outlet 30 thus allowing the steam to flow from the chambers 17 to the atmosphere.

The present engine which is of turbine type may be used for various purposes, and is of advantage for many reasons, which will be apparent from the foregoing, taken in connection with the drawings without further comment being necessary.

Having thus described the invention, what is claimed as new is:

1. A rotary engine comprising an annular stator having side plates, and a rotor mounted for rotation within the stator, the side faces of the rotor having opposite chambers providing shoulders, the periphery of the rotor having chambers between the side faces thereof, the stator having inlet ports with which the first mentioned chambers communicate alternately, having a passage provided with ports with which the first mentioned chambers communicate after leaving the first mentioned ports and with the port with which the second mentioned chambers communicate in succession, and having an outlet port with which the second mentioned chambers communicate after leaving the third mentioned port.

2. A rotary engine comprising an annular stator having side plates, and a cylindrical rotor mounted for rotation within the stator, the periphery of the rotor working snugly adjacent the stator and the side faces of the rotor working snugly adjacent said side plates, the side faces of the rotor having diametrically opposite arcuate chambers extending to the periphery of the rotor, each of said chambers being deep at one end to provide a shoulder and being shallow at the other end, said chambers having helical walls facing said side plates and provided with a series of shoulders facing in the same direction with respect to the periphery of the rotor as the aforesaid shoulders, the periphery of the rotor having diametrically opposite semi-crescent-shaped chambers providing shoulders at the deep ends thereof, the second mentioned chambers being disposed between the side faces of the rotor, the side plates having oblique inlet ports with which the first mentioned chambers communicate alternately and adapted to direct steam into the first mentioned chambers so that it impinges against said shoulders, having a longitudinal passage having a port at one end with which the second mentioned chambers communicate in succession, and having an outlet port with which the second mentioned chambers communicate after leaving the second mentioned port, said passage having branches provided with ports with which the first mentioned chambers communicate after leaving the first mentioned ports.

3. A rotary engine comprising an annular stator having side plates, a cylindrical rotor mounted for rotation within the stator, one side face of the rotor having an arcuate chamber which is deep at one end to provide a shoulder and which is shallow at the other end, the chamber having a helical wall facing one side plate, said wall being of zig-zag shape to provide a series of shoulders arranged at an acute angle relative to said side plate and facing in the same general direction with respect to the periphery of the rotor as the first mentioned shoulder, said side plate having an oblique inlet port for directing steam against said shoulders, and the stator having an outlet port with which said chamber communicates after leaving the first mentioned port.

In testimony that I claim the foregoing as my own, I have hereto affixed my signature in the presence of two witnesses.

JOHN L. FLESHMAN.

Witnesses:
MARIE J. EIDEN,
Mrs. C. WADSWORTH.